Aug. 7, 1923. 1,463,899
J. McKECHNIE
BROACHING AND SIMILAR MACHINE
Filed May 20, 1919 2 Sheets-Sheet 1
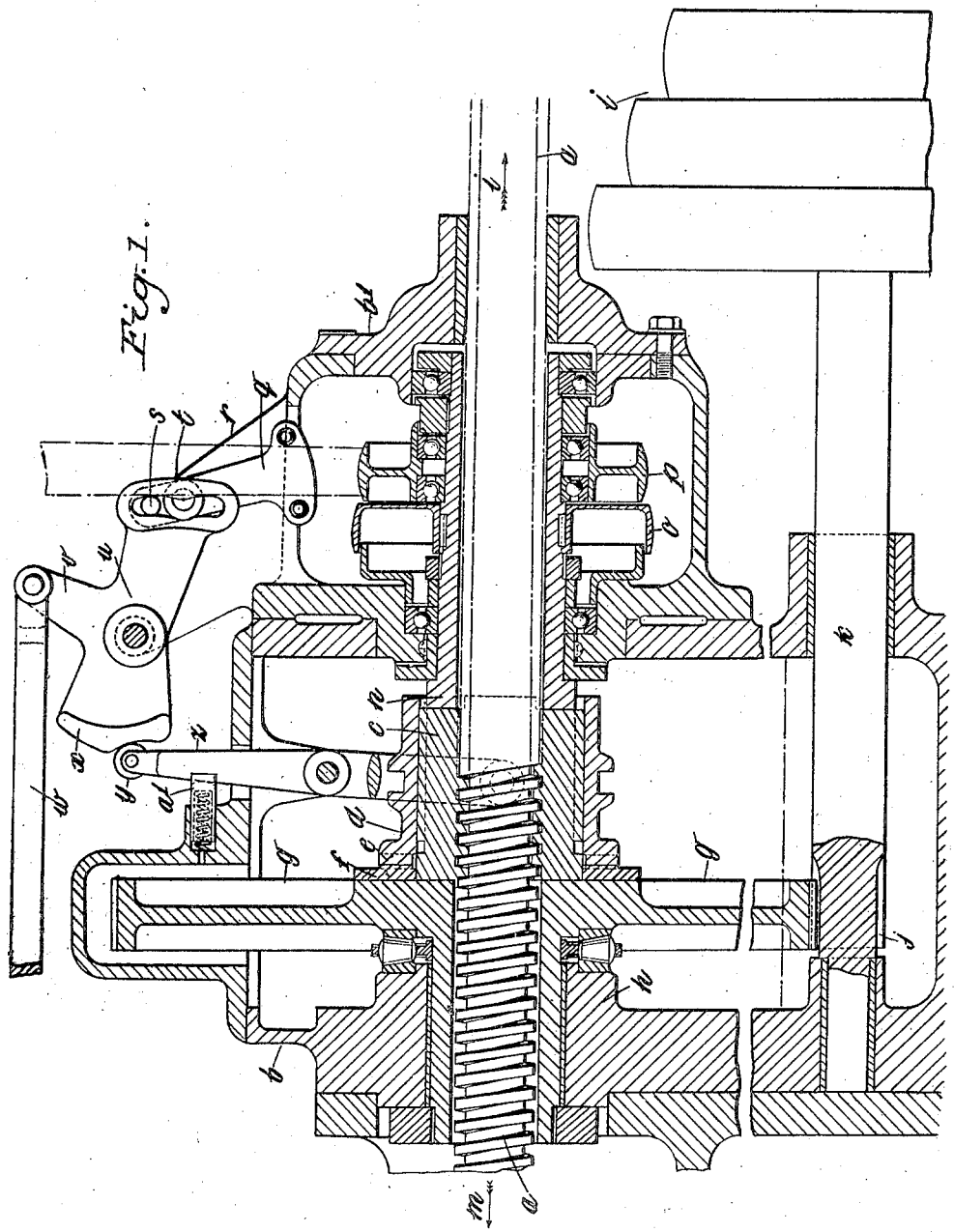

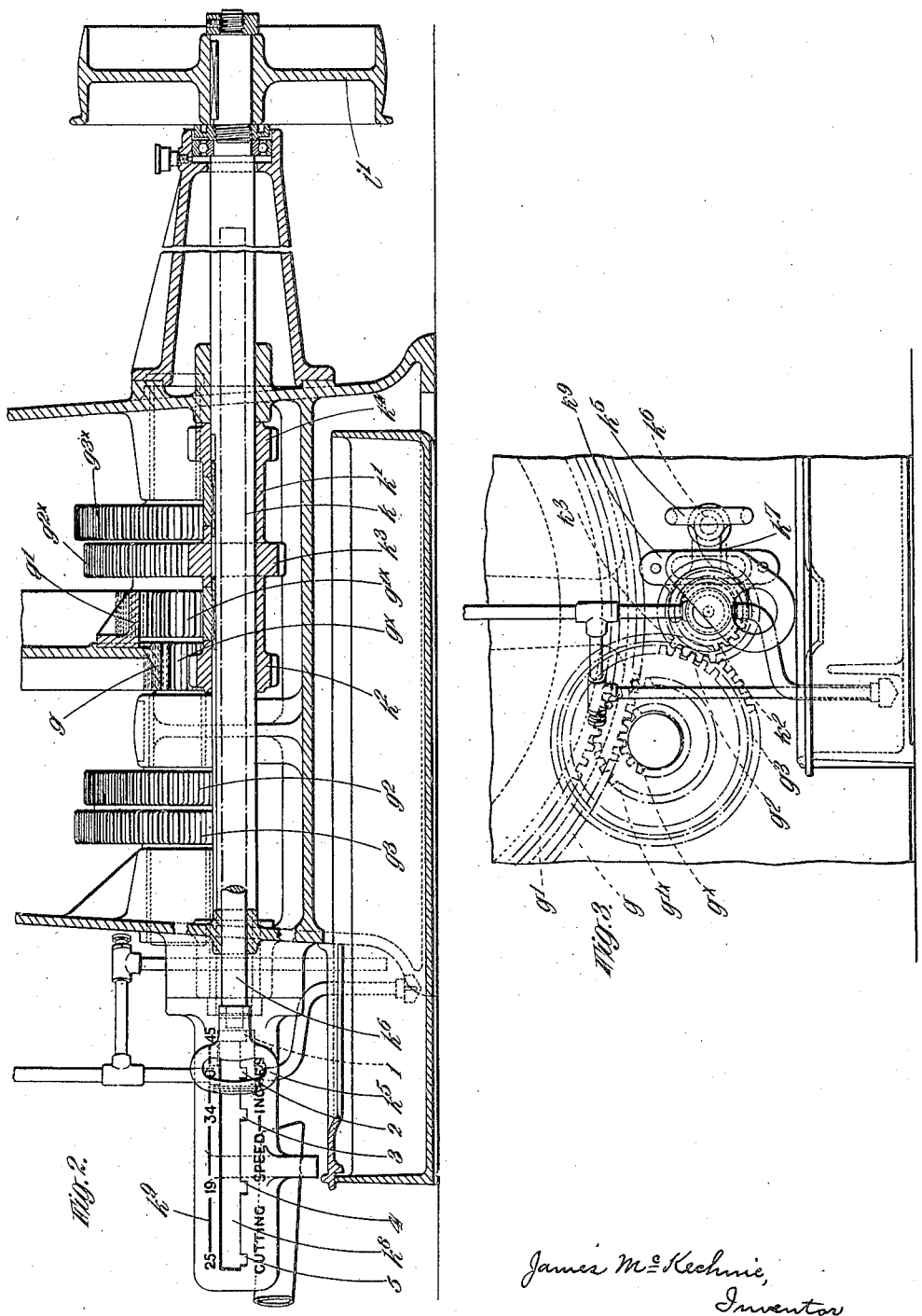

Patented Aug. 7, 1923.

1,463,899

UNITED STATES PATENT OFFICE.

JAMES McKECHNIE, OF BARROW-IN-FURNESS, ENGLAND, ASSIGNOR TO VICKERS LIMITED, OF WESTMINSTER, LONDON, ENGLAND.

BROACHING AND SIMILAR MACHINE.

Application filed May 20, 1919. Serial No. 298,424.

*To all whom it may concern:*

Be it known that I, JAMES McKECHNIE, a subject of the King of Great Britain, residing at Naval Construction Works, Barrow-in-Furness, in the county of Lancaster, England, have invented certain new and useful Improvements in or Relating to Broaching and Similar Machines, of which the following is a specification.

This invention relates to broaching and similar machines of the kind in which the rate of feed of the tool or tools during the cutting operation and the return movement thereof are controlled through the medium of a screw adapted to be traversed in opposite directions, the chief object being to obtain a more rapid and constant return movement of the said screw than heretofore.

In connection with machines of the kind above referred to, the rate of the return movement of the said screw has heretofore been relatively slow by reason of all the members governing the return movement being in operative and positive connection with the prime mechanism for controlling the cutting movement of the screw, with the result that any variation of the cutting movement of the screw correspondingly affected the return movement thereof.

According to this invention, means are provided whereby the mechanisms for obtaining the cutting and return movements of the screw are adapted to serve as independent units of control, thus enabling the rate of the cutting movement of the screw to be varied as required and the return movement of the screw to be maintained at a constant rate in excess of that hitherto obtained, so that a considerable saving of time is effected more particularly in such classes of work where a long traverse of the screw and a very slow rate of feed during the cutting movement are required.

In order that the said invention may be clearly understood and readily carried into effect the same will now be described more fully with reference to the accompanying drawing in which Figure 1 is a longitudinal sectional view of a portion of a broaching machine embodying the invention, Figure 2 is a longitudinal sectional view of a form of change speed gear for use with the broaching machine, and Figure 3 is an end elevation of Figure 2.

Referring to Figure 1, $a$ denotes the aforesaid screw which is shown extending longitudinally through the ends of a box or casing $b$ and engaged by a nut $c$ adapted to be rotated in either direction. $d$ is a clutch element which is arranged in sliding feather-and-groove connection with said nut and is provided with a clutch face $e$ which is caused to engage a corresponding clutch face $f$ on a spur wheel $g$ mounted within the casing $b$ on a bearing $h$, when it is desired to drive the said nut at the relatively slow speed in the direction for moving the screw axially in the direction of the arrow $i$ for effecting the cutting operation. The spur wheel $g$ meshes with a pinion $j$ on a driven countershaft $k$ extending into the casing $b$, which serves as an oil bath for the said gearing, the said countershaft being provided with a coned or stepped belt pulley $l$ whereby the rate of the cutting movement of the screw may be varied in accordance with requirements. In order to obtain the quick return movement of the screw $a$ in the direction of the arrow $m$, the nut $c$ is driven in the opposite direction to that aforesaid by means of a sleeve $n$ directly connected at its inner end thereto, the said sleeve being freely mounted relatively to the screw $a$ and provided with fast and loose belt pulleys $o$ and $p$, respectively, arranged within a box or casing $b'$ secured to the aforesaid casing $b$. As shown, the belt is adapted to be moved from the loose pulley to the fast pulley or vice versa by means of a belt shifter $q$ pivotally mounted on a bracket $r$ on the casing $b'$. The said belt shifter is provided with a pin $s$ working in a cam-shaped slot $t$ formed at one end of a rocking member $u$ mounted on the said bracket $r$ and having an arm $v$ connected to a common actuating or control rod $w$. The other end of the said rocking member is provided with a cam face $x$ adapted to operate upon a roller $y$ at the upper end of a pivoted lever $z$ for moving the sliding clutch element $d$ against the action of a spring-pressed pin $a'$ operating upon the said lever $z$ and tending to maintain the said clutch element in engagement with the clutch face on the spur wheel $g$. With this arrangement of devices, it will be seen that there is no liability of the clutch element $d$ and the sleeve $n$ becoming operatively connected with the screw $a$ at the same time. It will thus be seen that when the nut $c$ is driven from the toothed gearing $g$, $j$ the screw will be moved forward at the relatively slow cutting speed and that when the said nut $c$ is driven by the sleeve $n$ from the belt pulley $o$ the screw will be moved in the reverse direction at a relatively high speed.

In Figures 2 and 3 which show the stepped or coned pulley $l$ of Figure 1 replaced by a single belt pulley $l'$ and a change speed gear, the spur-wheel $g$ corresponds in function to the spur-wheel $g$ of Figure 1 and has connected to it a toothed ring $g'$ of somewhat smaller diameter. Meshing with the spur-wheel $g$ is a pinion $g^\times$ rigidly connected to two other pinions $g^2$ and $g^3$. Meshing with the toothed ring $g'$ is a pinion $g'^\times$ rigidly connected to two other pinions $g^{2\times}$ and $g^{3\times}$. The pinion $g^\times$ is of smaller diameter than the pinion $g'^\times$, the pinion $g^2$ is the same diameter as the pinion $g^{2\times}$, and the pinion $g^3$ is the same diameter as the pinion $g^{3\times}$. The two sets of pinions ($g^\times$, $g^2$ and $g^3$) and ($g'^\times$, $g^{2\times}$ and $g^{3\times}$) are mounted for independent rotation and are arranged in line axially. The shaft $k$ to which the pulley $l'$ is connected has slidably keyed thereto a sleeve $k'$ formed with three pinions $k^2$, $k^3$, $k^4$ of which the two outer ones $k^2$ and $k^4$ are of equal diameter and the center one $k^3$ is of larger diameter than the others. The sleeve $k'$ is moved along the shaft $k$ by suitable means including a handle $k^5$ and a rod $k^6$ to which the handle is rotatably connected. This handle has a projection $k^7$ (Figure 3) which works in a slot $k^8$ in a frame $k^9$ and which is adapted to be engaged, by angular movement of the handle, in one or other of four notches 1, 3, 4 and 5 corresponding to adjustments of the sleeve $k'$ to give different speeds of the gear, or in a notch 2 corresponding to the neutral position of this gear. In the position of the sleeve $k'$ shown in Figure 2, the projection $k^7$ is engaging in the notch 1 corresponding to the maximum cutting speed and the pinion $k^3$ is meshing with the pinion $g^{2\times}$. Movement of the rod $k^6$ towards the left first brings the pinion $k^3$ out of mesh with the pinion $g^{2\times}$ and gives the neutral position determined by the notch 2, then brings the pinion $k^4$ into mesh with the pinion $g^{3\times}$ to give the second highest speed determined by the notch 3, then brings the pinion $k^2$ into mesh with the pinion $g^3$ to give the lowest speed determined by the notch 4 and finally brings the pinion $k^3$ into mesh with the pinion $g^2$ to give the second lowest speed determined by the notch 5.

What I claim and desire to secure by Letters Patent of the United States is:—

1. In a machine of the kind referred to, a tool actuating screw, a rotatable nut in engagement with said screw, mechanism for driving said nut in one direction to effect the operative movement of the screw, a clutch device for at will connecting said mechanism to or disconnecting it from the nut, mechanism for driving the nut in the reverse direction to effect the return movement of the screw and means additional to said clutch device for connecting the second-mentioned mechanism to the nut when the latter has been disconnected from the first-mentioned mechanism.

2. In a machine of the kind referred to, a tool actuating screw, a rotatable nut in engagement with said screw, mechanism for driving said nut in one direction to effect the operative movement of the screw at a relatively slow speed, means for at will connecting said mechanism to or disconnecting it from the nut, a belt pulley which is in constant operative connection with said nut, a loose belt pulley, a belt engaging with the latter pulley when said mechanism is connected to the nut and driving said loose pulley in the reverse direction to, and at a greater speed than, the movement given to the other pulley by said mechanism and means associated with the first-mentioned means for causing said belt to be moved onto the first-mentioned pulley after said mechanism has been disconnected from the nut and for returning the belt to the loose pulley before said mechanism is again connected to the nut.

3. In a machine of the kind referred to, a tool actuating screw, a rotatable nut in engagement with said screw, mechanism for driving said nut in one direction to effect the operative movement of the screw at a relatively slow speed, a sliding clutch element for at will connecting said mechanism to or disconnecting it from the nut, a belt pulley which is in constant operative connection with said nut, a loose belt pulley, a belt engaging with the latter pulley when said mechanism is connected to the nut and driving said loose pulley in the reverse direction to, and at a greater speed than the movement given to the other pulley by said mechanism and means associated with the said sliding clutch element for causing said belt to be moved on to the first-mentioned pulley after said mechanism has been disconnected from the nut and for returning the belt to the loose pulley before said mechanism is again connected to the nut.

4. In a machine of the kind referred to, a tool actuating screw, a rotatable nut in engagement with said screw, mechanism for rotating said nut in one direction and obtaining a relatively slow operative movement of said screw, mechanism for rotating said nut in the opposite direction and obtaining a relatively quick return movement of said screw, said mechanisms being adapted to be independently driven, a cam device, means associated with said cam device and with said mechanism for enabling either of said mechanisms to be brought into operation when the other is thrown out of action and an actuating member for said device.

In testimony whereof I affix my signature.

JAMES McKECHNIE.